United States Patent [19]

Hofgren Jon M.

[11] Patent Number: 4,892,421

[45] Date of Patent: Jan. 9, 1990

[54] BEARING WITH COMPOSITE LOAD BEARING SURFACES

[76] Inventor: Hofgren Jon M., 3805 NW. 16th Blvd., Gainesville, Fla. 32605

[21] Appl. No.: 141,954

[22] Filed: Jan. 11, 1988

[51] Int. Cl.$^4$ ............................................. F16C 27/04
[52] U.S. Cl. ..................................... 384/492; 384/569
[58] Field of Search ............... 384/492, 536, 582, 611, 384/620, 911, 569

[56] References Cited

U.S. PATENT DOCUMENTS

| | | | |
|---|---|---|---|
| 2,724,624 | 11/1955 | Barr | 384/492 |
| 3,212,834 | 10/1965 | Mayer et al. | 384/492 |
| 4,674,164 | 6/1987 | McCloskey | 384/911 |

Primary Examiner—Lenard A. Footland
Attorney, Agent, or Firm—Arthur G. Yeager; Earl L. Tyner

[57] ABSTRACT

A nonlubricated roller or ball bearing in which a resilient surface is placed between the roller or ball and the raceway in which the roller or ball is retained. The bearing is useful in environmemnts that are damaging to precision roller or ball bearings.

8 Claims, 2 Drawing Sheets

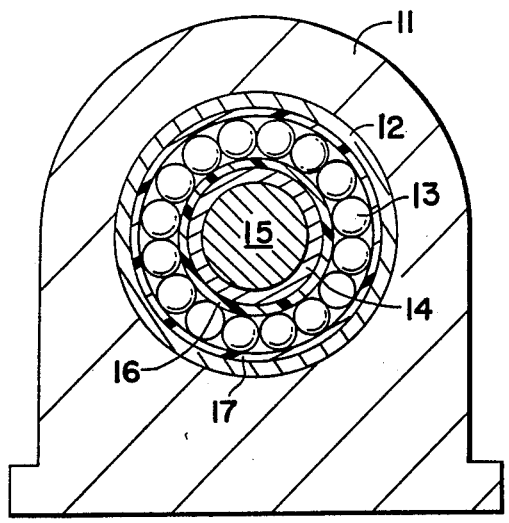
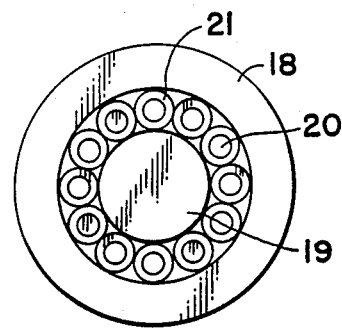
FIG 1
FIG 2
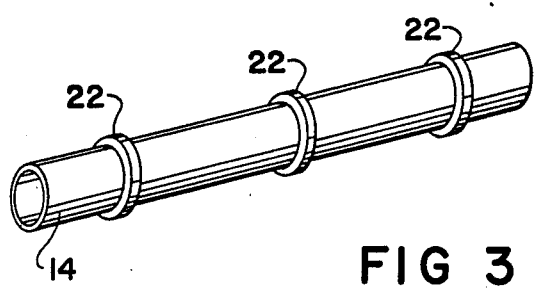
FIG 3
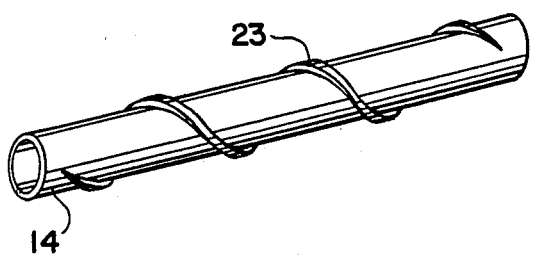
FIG 4

4,892,421

BEARING WITH COMPOSITE LOAD BEARING SURFACES

BACKGROUND OF THE INVENTION

Roller bearings and ball bearings ar generally considered to be the best types of bearings in their abilities to reduce friction. In earlier times they were called "anti-friction bearings". Such bearings are very important components of high speed machines of all sorts, but because of the high hardness and quality of the bearing races and the balls or the roller, lubrication is required to accomodate the slippage between these hard, polished components. In any kind of dusty or corrosive environment, seals must be employed to assure that the polished surfaces of the rollers or balls are not damaged in any way, such as by scratching or corroding. Once the surface of a roller or ball is marred in any respect, the contacting surfaces of the bearing begin to deteriorate and sooner or later the entire bearing must be replaced.

Bearings are generally expensive because they employ very hard materials which will not easily be deformed or marred and are made by using very precise machining methods. Accordingly, there is a need for a simple bearing that is inexpensive and can be used in dusty or corrosive environments, particularly without lubrication.

It is an object of this invention to provide a novel roller or ball bearing which has composite bearing surfaces. It is another object of this invention to provide a roller or ball bearing that can be operated without lubrication in a dusty or corrosive atmosphere. Still other objects will become apparent from the more detailed description which follows.

BRIEF SUMMARY OF THE INVENTION

This invention relates to a bearing for a rotating shaft wherein the bearing includes a plurality of rolling members retained in free rolling relationship by an inner race mounted on the shaft and an outer race mounted on the housing supporting the shaft. The improvement of this invention comprises incorporating between the races and the rolling members a thin layer of resilient material having, preferably a Shore Hardness of about 80A to 95A, and the ability to rapidly and completely recover from deflections; or at higher speeds, by hysterisis, to remain in the compressed position.

In preferred embodiments the races of the bearing are metal, plastic, or other material coated with a layer, 0.01 to 0.10 inch thick, of a fiber reinforced resilient material which is rubber, neoprene, polyurethane, or other materials of similar properties.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by referrence to the following description taken in connection with the accompanying drawings in which:

FIG. 1 is a cross-sectional view of the bearing of this invention;

FIG. 2 is an end elevational view of a bearing of this invention where the rolling elements are fitted with resilient strips;

FIG. 3 is a perspective view of one embodiment of the inner race of the bearing of FIG. 1;

FIG. 4 is a perspective view of a second embodiment of the inner race of the bearing of FIG. 1;

DETAILED DESCRIPTION OF THE INVENTION

The invention is best understood by reference to the attached drawings.

Figure 5:
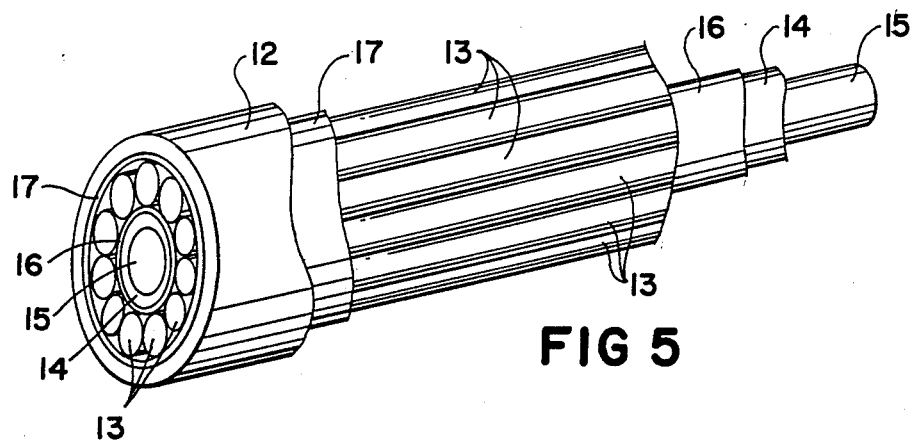
FIG. 5 is a perspective view of the bearing of FIG. 1 with selected parts broken away to show the inner relationships.

In FIG. 1 there is shown a cross-section of a ball or roller bearing of this invention. In FIG. 5 there is shown the same bearing in perspective with broken away portions to show how all components fit together. The rolling elements 13 of the bearing may be rollers or balls, which are retained in position by an outer race 12 and an inner race 14, and optionally including a cage to maintain the rolling elements 13 in a spaced relationship. Outer race 12 is rigidly fastened in a housing 11 which supports the entire bearing, and shaft 15 is rigidly attached to inner race 14 and rotates with shaft 15 radially about its axis. All of the foregoing components are well known prior art members of bearings. In the bearing of this invention, the contact between rolling elements 13 and the two races 12 and 14 is not a metal-to-metal contact, but rather is a rolling contact between rolling element 13 and resilient linings 16 and 17. Lining 17 is fastened to the inside of outer race 12, and lining 16 is fastened to the outside of race 14. Rolling elements 13, therefore, roll on linings 16 and 17 with races 14 and 12, respectively, functioning as back supports for the linings. Linings or facings 16 and 17 are preferably bonded or cast in situ to supports 12 and 14 in the same manner as automobile brake linings or facings are bonded to supporting elements.

Linings 16 and 17 are thin pieces of resilient material. The thickness of such linings may be from about 0.01 inch to about 0.10 inch in most applications. The resilience is such that a rolling ball or roller at low speed carrying a load causes the lining to deflect in an elastic manner and to q quickly and completely recover from that deflection when the ball or roller has passed by. At high speed the lining remains in stretched or extended condition. The recover capability is sometimes referred to as a "high hysterisis". The material must, of course, be sufficiently tough and hard not to tear under such loads, and this is accomplished by employing materials with fiber reinforcement such as that in automobile tires. An accepted measurement of hardness which describes these materials is a Shore Hardness of 80A to 95A. Among the materials suitable for this purpose are fiber reinforced elastomeric compounds. Preferred materials are rubber, neoprene, or polyurethane, anyone of which is reinforced with fibers or fabrics of nylon, cotton, carbon, glass, or other materials with similar properties.

Bearings of the type described above and as embodied by FIG. 1 are capable of functioning well in dusty atmospheres with or without lubrication at moderate speeds, e.g. 100-500 rpm. The dust or grit in the environment may be as large as about 20-30 microns. Shaft 15 rolling elements 13, and races 12 and 14 may be any of the common metals, e.g. steel, stainless steel, brass, aluminum, or the like, or plastics, such as nylon, polyvinylchloride, polyacetal, polyolefin, etc.

In FIG. 2 there is shown a different embodiment of the invention wherein rollers 20 are covered with a sleeve or are fitted with rings or helical strips 21 of a resilient material to serve the same purpose of that of FIG. 1. Rings or helical strips 21 are positioned similarly on each roller 13 as the rings and strips shown in FIGS. 3 and 4 on inner race 14. In FIG. 2 there is no lining of resilient material applied to an inner or an outer race. The only resilient material employed are the sleeves, rings, helical strips 21. The entire bearing comprises an outer race or a housing 18, a shaft 19, and a plurality of rollers 20 having complete or partial coating 21 of resilient material attached to the outside of each roller 20. A plurality of rings or helical strip 21 are the preferred forms of the partial coating 21 of FIG. 2. The resilient material 21 is the same material as specified above for linings 16 and 17 in FIG. 1. Similarly, the same types of materials described above for shaft 15, rolling elements 13, and races 16 and 17 in FIG. 1 are contemplated for housing or race 18, roller 20, and shaft 19 in FIG. 2.

Figure 6:
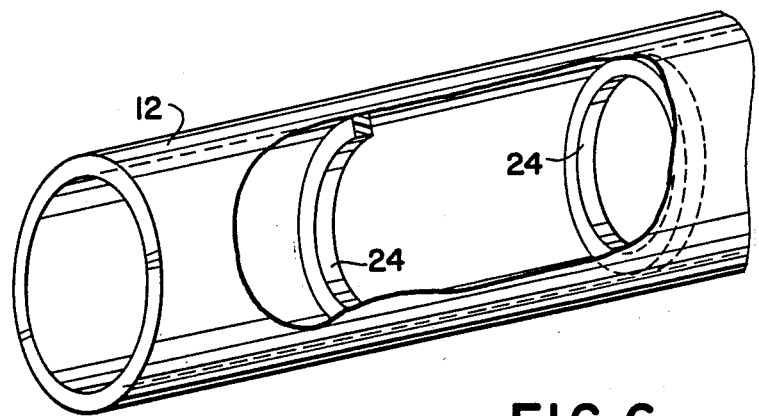
FIG. 6 is a perspective view of one embodiment of the outer race of the bearing of FIG. 1.
Figure 7:
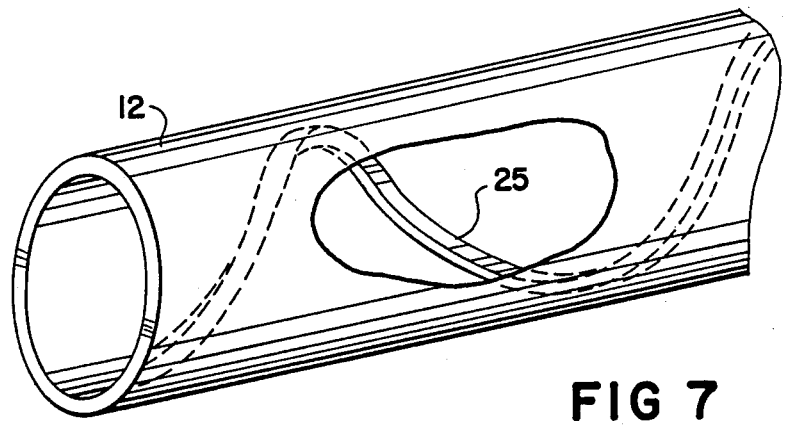
FIG. 7 is a perspective view of a second embodiment of the outer race of the bearing of FIG. 1.

In FIGS. 3, 4, 6, and 7 there is shown another embodiment of this invention. In this instance the inner race 14 and the outer race 12 are fitted with rings or helical strips of resilient material similar to that of linings 16 and 17. In FIG. 3 there are several sparate spaced rings 22 and in FIG. 4 there is one or more helical strips 23. In FIG. 6 there are several spaced rings 24 substantially indentical to rings 22 except that they are mounted on an inside surface of race 12 instead of an outside surface of race 14. Similarly strips 25 are the same as strips 23 except that strips 25 are mounted on the inside surface of race 12 while strips 23 are on the outside of race 14. In this embodiment housing 11, rollers 13, races 12 and 14, and shaft 15 may all be of smooth uncovered steel or other metal or plastic with rings 22 and 24 or strips 23 and 25 taking all the forces produced in the bearing.

A particularly suitable place to use the bearings of this invention is in a boat trailer which travels over paved and unpaved areas and frequently is submerged in salt water. These conditions of environment are readily handled by the bearing of this invention, which can be made of inexpensive, noncorroding materials. Other uses might be in connection with conveyer belts, marine apparatus, small wagons, underwater rollers at a marina, replacement for AFBMA Class V bearings, nylon bearings, and other uses where dust or corroding environment is a problem. The bearing of this invention actually benefits to some degree by operating in a dusty environment because the dust particles tend to polish the roller, the ball, and the races, and thereby make an even smoother operation. Bearings of 100% resilient material, as compared to these of this invention wherein the resilient material is a thin layer over a hard backing support, tend to overheat while the present bearing has good heat transmission and does not overheat in normal use.

The elements of a modern prior art bearing are always faced with the problem of dissipating heat because they are sealed to contain the lubricant and to be protected from contaminants. Overheating of such bearings nearly always leads to a complete breakdown of the bearing elements and their functions.

In the bearing of the present invention air flows freely through the bearing elements providing all the cooling necessary to prevent breakdown from overheating.

Among the other advantages of the bearing of this invention is the use of much lighter weight materials, e.g. about 10-15% of the weight of present metal bearings. Moreover, the bearings of this invention can be made of shelf stock or of cast parts and need not be custom manufactured or precision machined.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. In a bearing for a rotating shaft wherein the bearing includes a plurality of rolling members retained in free rolling relationship by an inner race mounted on said shaft and an outer race mounted on a housing supporting said shaft, the improvement which comprises incorporating between said races, and said rolling member a thin layer of fiber reinforced elastomeric material being capable of rapid and complete recovery from deflections.

2. The bearing of claim 1 wherein said resilient material is selected from the group consisting of polyurethane, neoprene, and rubber.

3. The bearing of claim 1 wherein said races are of metal or plastic with the surface of the race which faces said rolling members separated from said rolling member by said fiber reinforced elastomeric material having a thickness of 0.01 to 0.10 inch.

4. The bearing of claim 3 wherein said fiber reinforced elastomeric material has a Shore Haraness of about 80A to 95A.

5. The bearing of claim 3 in which said fiber reinforced elastomeric material completely covers said surface.

6. The bearing of claim 3 wherein said fiber reinforced elastomeric material is in the form of a plurality of parallel thin strips spaced apart from each other on said surface.

7. The bearing of claim 3 wherein said fiber reinforced elastomeric material is in the form of one or more thin helical strips on said surface.

8. The bearing of claim 3 wherein said fiber reinforced elastomeric material is laminated to a support member having a high thermal conductivity.

* * * * *